(12) United States Patent
Symons et al.

(10) Patent No.: US 10,332,042 B2
(45) Date of Patent: Jun. 25, 2019

(54) MULTICHANNEL DIGITAL MARKETING PLATFORM

(75) Inventors: Matthew Symons, Oakland, CA (US);
Anatoly Roytman, Weston, MA (US);
Stephen Denis Kirkby, Unley Park (AU); Andris Umblijs, Woking (GB);
Janmesh Srivastava, London (GB);
Michael J Williams, San Francisco, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 638 days.

(21) Appl. No.: 13/201,774

(22) PCT Filed: Feb. 17, 2010

(86) PCT No.: PCT/US2010/024397
§ 371 (c)(1),
(2), (4) Date: Sep. 13, 2011

(87) PCT Pub. No.: WO2010/096428
PCT Pub. Date: Aug. 26, 2010

(65) Prior Publication Data
US 2011/0320262 A1    Dec. 29, 2011

Related U.S. Application Data

(60) Provisional application No. 61/153,191, filed on Feb. 17, 2009, provisional application No. 61/153,195, (Continued)

(51) Int. Cl.
*G06Q 30/00* (2012.01)
*G06Q 10/04* (2012.01)
*G06Q 30/02* (2012.01)

(52) U.S. Cl.
CPC ............. *G06Q 10/04* (2013.01); *G06Q 30/02* (2013.01); *G06Q 30/0243* (2013.01); *G06Q 30/0254* (2013.01)

(58) Field of Classification Search
CPC ..................................................... G06Q 30/02
(Continued)

(56) References Cited

U.S. PATENT DOCUMENTS 6,339,438 B1    1/2002 Bates
7,046,434 B1    5/2006 DiJaili et al.
(Continued)

FOREIGN PATENT DOCUMENTS

JP    2001-184429 A    7/2001
JP    2001188737 A     7/2001
(Continued)

OTHER PUBLICATIONS

International Search Report, PCT/US2010/24397, dated Apr. 1, 2010.
(Continued)

*Primary Examiner* — Sun M Li
(74) *Attorney, Agent, or Firm* — Mannava & Kang, P.C.

(57) ABSTRACT

A method and system optimizes investments for each marketing channel of a multichannel marketing campaign. Past optimal investments are compared to current sales or profits for each marketing channel, and a new optimal investment is estimated for each marketing channel, which may be used as a marketing budget. A marketing dashboard is used to determine the new optimal investments for the marketing channels, and the new optimal investments are stored in a marketing database.

22 Claims, 11 Drawing Sheets

Related U.S. Application Data filed on Feb. 17, 2009, provisional application No. 61/153,196, filed on Feb. 17, 2009.

(58) Field of Classification Search
USPC .................. 705/14, 14.4, 14.73; 713/182
See application file for complete search history.

(56) References Cited

U.S. PATENT DOCUMENTS

| | | | |
|---|---|---|---|
| 7,200,607 | B2 | 4/2007 | Downs |
| 7,330,839 | B2 | 2/2008 | Srinivasan et al. |
| 7,734,503 | B2 | 6/2010 | Agarwal et al. |
| 7,860,859 | B2 | 12/2010 | Haugen |
| 2004/0044565 | A1* | 3/2004 | Kumar et al. .................. 705/14 |
| 2004/0044571 | A1 | 3/2004 | Bronnimann et al. |
| 2004/0093296 | A1 | 5/2004 | Phelan et al. |
| 2005/0060551 | A1* | 3/2005 | Barchi et al. ................. 713/182 |
| 2005/0071223 | A1 | 3/2005 | Jain et al. |
| 2005/0283395 | A1 | 12/2005 | Lesandrini et al. |
| 2006/0069614 | A1 | 3/2006 | Agarwal et al. |
| 2006/0149631 | A1 | 7/2006 | Brazell et al. |
| 2006/0253327 | A1 | 11/2006 | Morris et al. |
| 2007/0124194 | A1 | 5/2007 | Barnette et al. |
| 2007/0174127 | A1 | 7/2007 | Lee |
| 2008/0183573 | A1 | 7/2008 | Muschetto |
| 2008/0235085 | A1 | 9/2008 | Kovinsky et al. |
| 2008/0306810 | A1 | 12/2008 | Ranka et al. |
| 2008/0320004 | A1* | 12/2008 | Jain et al. ........................ 707/10 |
| 2009/0024718 | A1 | 1/2009 | Anagnostopoulos et al. |
| 2009/0030784 | A1 | 1/2009 | Goyal et al. |
| 2009/0099902 | A1 | 4/2009 | Chatter et al. |
| 2009/0171721 | A1 | 7/2009 | LeBaron et al. |
| 2009/0259520 | A1 | 10/2009 | Puri et al. |
| 2010/0036722 | A1 | 2/2010 | Cavander et al. |
| 2010/0036726 | A1 | 2/2010 | Gallet |
| 2010/0070876 | A1* | 3/2010 | Jain ........................ G06Q 30/02 715/748 |
| 2010/0145793 | A1 | 6/2010 | Cavander et al. |
| 2010/0211455 | A1 | 8/2010 | Williams et al. |

FOREIGN PATENT DOCUMENTS

| | | |
|---|---|---|
| JP | 2001283087 A | 10/2001 |
| JP | 2002024692 A | 1/2002 |
| JP | 2002149943 A | 5/2002 |
| JP | 2002298015 A | 10/2002 |
| JP | 2003006377 A | 1/2003 |
| JP | 2004086715 A | 3/2004 |
| JP | 2004139490 A | 5/2004 |
| JP | 2004213330 A | 7/2004 |
| JP | 2004258796 A | 9/2004 |
| JP | 2004534299 A | 11/2004 |
| JP | 2005284884 A | 10/2005 |
| JP | 2005-537591 A | 12/2005 |
| JP | 2006011767 A | 1/2006 |
| JP | 2006-331390 | 12/2006 |
| JP | 2007-504556 A | 3/2007 |
| JP | 2007109265 A | 4/2007 |
| JP | 2007-516522 A | 6/2007 |
| JP | 2007265422 A | 10/2007 |
| JP | 2008-508619 A | 3/2008 |
| JP | 2008-515101 A | 5/2008 |
| JP | 2009-509244 A | 3/2009 |
| JP | 2010-508585 A | 3/2010 |
| JP | 2010066806 A | 3/2010 |
| JP | 2010-512604 A | 4/2010 |
| JP | 2010-517199 A | 5/2010 |
| JP | 2010-529523 A | 8/2010 |
| KR | 2007-73833 | 7/2007 |
| WO | 01/048646 | 7/2001 |
| WO | 2005/024667 A1 | 3/2005 |
| WO | 2005/052753 A2 | 6/2005 |
| WO | 2006/026030 A2 | 3/2006 |
| WO | 2006/039210 A2 | 4/2006 |
| WO | 2007/033358 A2 | 3/2007 |
| WO | 2007/035499 A2 | 3/2007 |
| WO | 2008/051807 A1 | 5/2008 |
| WO | 2008/073821 A1 | 6/2008 |
| WO | 2008/094930 A2 | 8/2008 |
| WO | 2008/116026 A | 9/2008 |
| WO | 2008/137194 A2 | 11/2008 |

OTHER PUBLICATIONS

Taniguchi, et al., "Constrained Learning Algorithm of Neural Networks for an Estimate of Advertising effect", The Transactions of the Institute of Electrical Engineers of Japan, vol. 117-C, No. 5, Japan, Apr. 20, 1997, pp. 625-630.

Japanese Notice of Reason(s) for Refusal for Japanese Application No. 2010-031192, Japanese Patent Office, dated Mar. 19, 2013.

\* cited by examiner

MULTICHANNEL DIGITAL MARKETING PLATFORM

PRIORITY

This application is a national stage filing under 35 U.S.C. § 371 of PCT application number PCT/US2010/024397, having an international filing date of Feb. 17, 2010, which claims priority to the following U.S. provisional patent applications: U.S. provisional patent application Ser. No. 61/153,191, filed Feb. 17, 2009, and entitled "Segment Centered Infrastructure"; U.S. provisional patent application Ser. No. 61/153,195, filed Feb. 17, 2009, and entitled "Paid Search Optimization"; and U.S. provisional patent application Ser. No. 61/153,196, filed Feb. 17, 2009, and entitled "Display Advertising Optimization", all of which are incorporated by reference in their entireties.

BACKGROUND

Many companies are taking a step back to re-evaluate how they manage and execute marketing campaigns. Traditional marketing approaches and evaluation are in many cases not equal to today's marketplace challenges. For example, many companies engage in advertising through multiple marketing channels, such as TV, radio, Internet, etc., to improve their bottom line. However, it is difficult for these companies to correlate advertising and marketing expenditures across many different channels with profits. Furthermore, it is difficult to ascertain how to allocate a marketing budget among different types of marketing channels to maximize sales.

Companies are asking their marketing leadership for a more direct accounting of the marketing department's performance in terms of marketing investment and the effectiveness and efficiency of marketing operations. Given the challenges in correlating investment in multichannel marketing campaigns with sales, companies may be finding it difficult to determine how best to adjust marketing investments to maximize sales.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. Also, the embodiments may be used in combination with each other. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

1. Digital Marketing Platform

Optimization of a company's marketing campaign may include determining an investment in a combination of marketing channels that is estimated to achieve a business objective, such as maximizing returns, including revenue or profits. According to embodiments, systems and methods are provided for determining an investment in a combination of marketing channels to maximize returns, as well as optimizing each individual marketing channel.

Figure 1:
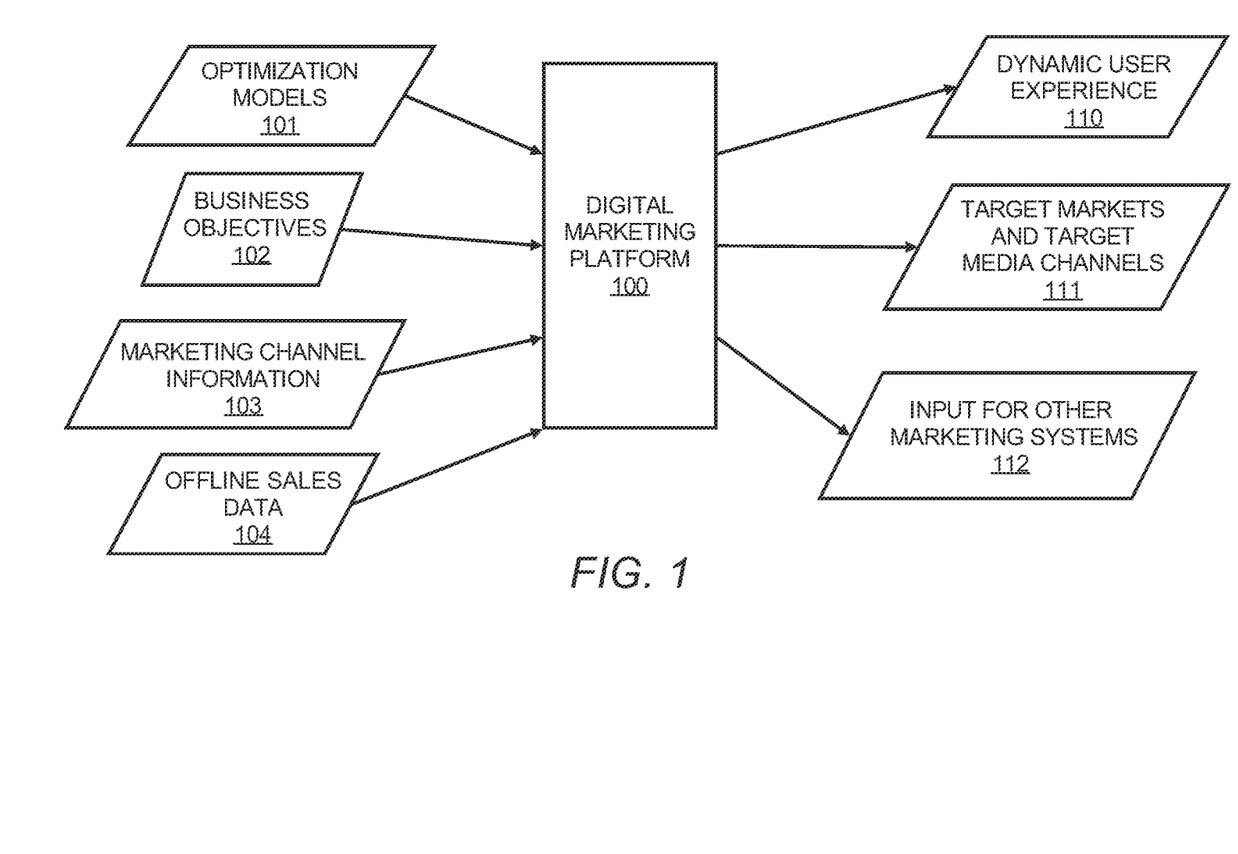
FIG. 1 illustrates a data flow diagram for a digital marketing platform, according to an embodiment.

FIG. 1 illustrates a digital marketing platform 100, according to an embodiment, that can optimize investment in multiple marketing channels to maximize returns. FIG. 1 shows a data flow for multichannel optimization for marketing using the digital marketing platform 100. The inputs to the digital marketing platform 100 include optimization models 101, which may be generated from historic analysis of data. The optimization models 101 may include response curves for estimating revenue and profit versus investment. Investment includes a monetary expenditure for marketing. The optimization models 101 may include multivariate models using regression analysis to estimate returns based on a proposed investment.

The digital marketing platform 100 also accepts one or more business objectives 102 as inputs. The digital marketing platform 100 allows users to simulate different investments in various marketing channels using the models 101 to determine which investments best satisfy the business objectives 102. Examples of the business objectives 102 may include maximizing profits and revenue, increasing market share, and increasing sales.

Marketing channels, also referred to as channels, include different types of marketing. Examples of marketing channels include TV, radio, online or Internet channels, such as display advertising, paid search or other online channels used to drive the user to a web site, and viral marketing which could be a form of an online marketing channel. Marketing channel information 103 is any marketing information related to these channels that may be used to optimize a marketing campaign. For example, the marketing channel information 103 may include identification of different channels previously used to access a company's web site or other product information, and how much a company paid for advertising in different channels and sales generated that may be responsive to advertising provided through the marketing channels. The marketing channel information 103 is stored and may be used to update the optimization models 101.

Another input is offline sales data 104. This may include in-store sales data that can be used for optimization, such as attributes of individuals buying certain products if known, seasonal changes in sales volume for different products, information for sales of certain products by region, etc. The offline sales data 104 marketing channel information 103 is stored and may also be used to update the optimization models 101.

An output of the digital marketing platform 100 includes a dynamic user experience 110. This may include real-time control of an online user experience, such as modification of web site, to achieve a business objective.

The digital marketing platform 100 may also identify target marketing channels 111, which includes an optimal mix of investments in different marketing channels to maximize returns. The target marketing channels 111 may include marketing channels for targeting users of different attributes most likely to make purchases, and may also specify when to advertise, and which channel to use for advertising. The target marketing channels 111 may also include an estimate of the maximum allowed investment for a marketing channel for maximizing returns. The maximum allowed investment may be used as a budget for a marketing channel.

Outputs from the digital marketing platform 100 may be used as inputs 112 to other marketing systems. For example, a system may be provided for creating the dynamic online user experience based on information provided by the digital marketing platform 100. In another example, the digital marketing platform 100 generates optimal bidding amounts used in a bidding system to bid on ad placement. Some of these other marketing systems may be provided as part of the digital marketing platform 100 or may be separate systems provided by other entities.

Figure 2:
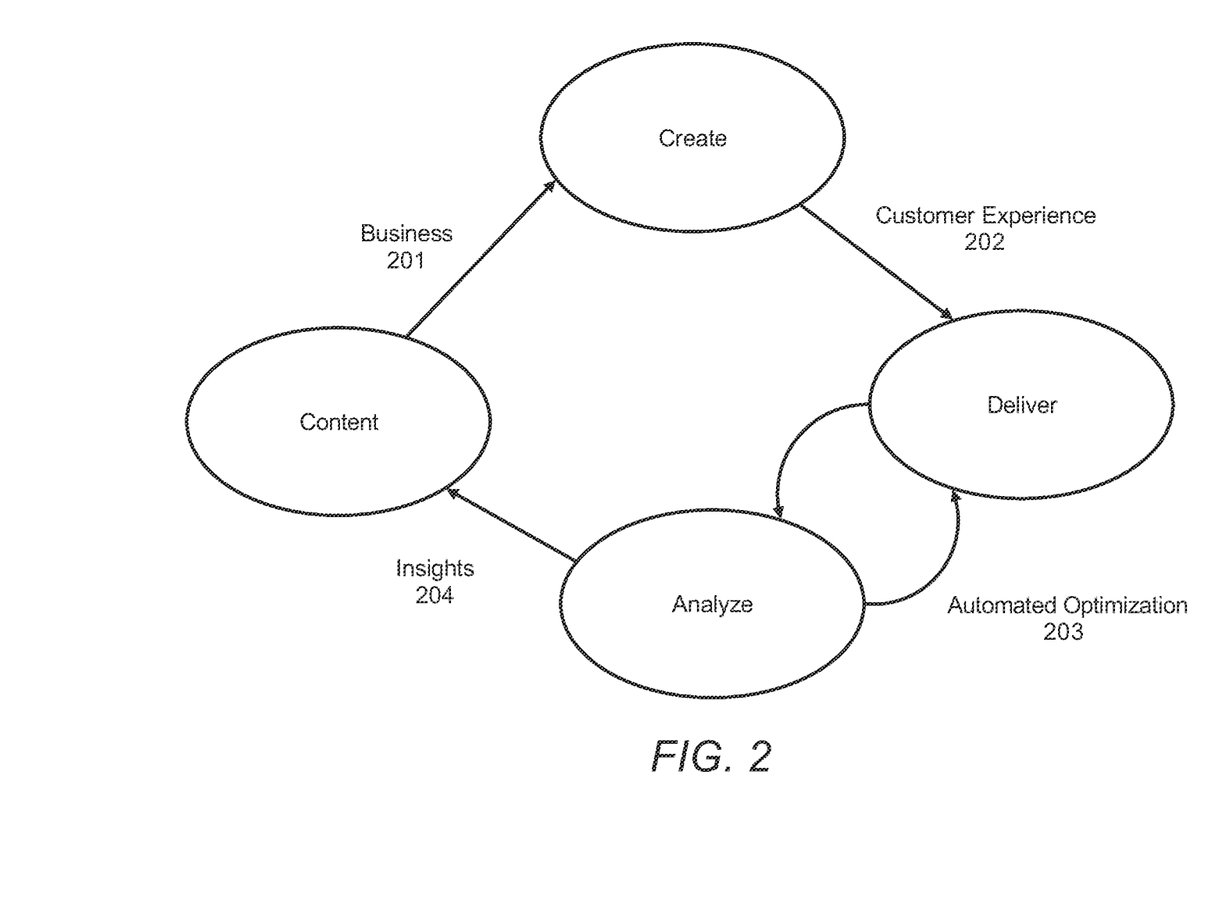
FIG. 2 illustrates a diagram detailing how optimization affects business objectives, according to an embodiment.

FIG. 2 shows in simplistic terms how the digital marketing platform 100 may be used to provide automated optimization of one or more marketing channels to achieve business objectives. A user of the digital marketing platform 100 may be a business, shown as business 201. The business 201 may provide content to be used for marketing channels to the digital marketing platform 100. This may include product pictures, product descriptions, logos, etc. The digital platform 100 uses the content to create ads or other marketing information to be delivered to customers through marketing channels. These ads may be part of a customer experience 202 (e.g., a dynamic user experience) created by the digital marketing platform 100.

Data is captured for the products and may be analyzed to determine how to modify the content provided in the ads to maximize returns. For example, the ads may be modified for different customers to increase the likelihood of generating sales. This is shown as automated optimization 203. Sales data and customer data may be continually captured to determine whether key performance indicators (KPIs) are being improved by the optimized content delivered to the customers. The KPIs may include metrics identified beforehand that reflect the critical success factors of the business 201.

The digital marketing platform 100 also provides insights 204 for the business 201. The insights 204 may be the KPIs resulting from the delivery of optimized content. The insights 204 may also identify which optimized content is achieving the best returns. Also, the insights 204 may include recommended investments in various marketing channels to maximize returns.

2. Search Marketing and Paid Search

According to an embodiment, the digital marketing platform 100 performs optimization of search marketing and paid search marketing channels. Optimized paid search and search marketing includes estimating an optimal investment in each marketing channel to maximize returns.

Search marketing is the process of improving the volume or quality of traffic to a specific web site from a search engines via natural or unpaid search results. For example, when a keyword search is performed using an Internet search engine, search results are generated and shown in a ranked-order list. The higher a web site appears in the search results, the more visitors it may receive from the search engine. Optimization of a web site may include optimizing web site content, meta-data and coding to improve web site placement in search results.

Paid search typically involves the payment for a position or rank in search results for one or more key words. For example, when a keyword search is performed using an Internet search engine, search results are generated and shown in a ranked-order list. An advertiser may pay for a particular ranking for an ad corresponding to a particular keyword or set of keywords. Multiple ads may be shown for a keyword, for example, next to search results, but higher ranking ads may be shown first in an ordered list. In many instances, advertisers enter a competitive bidding process for a particular ranking for their ad for a particular keyword.

Figure 3:
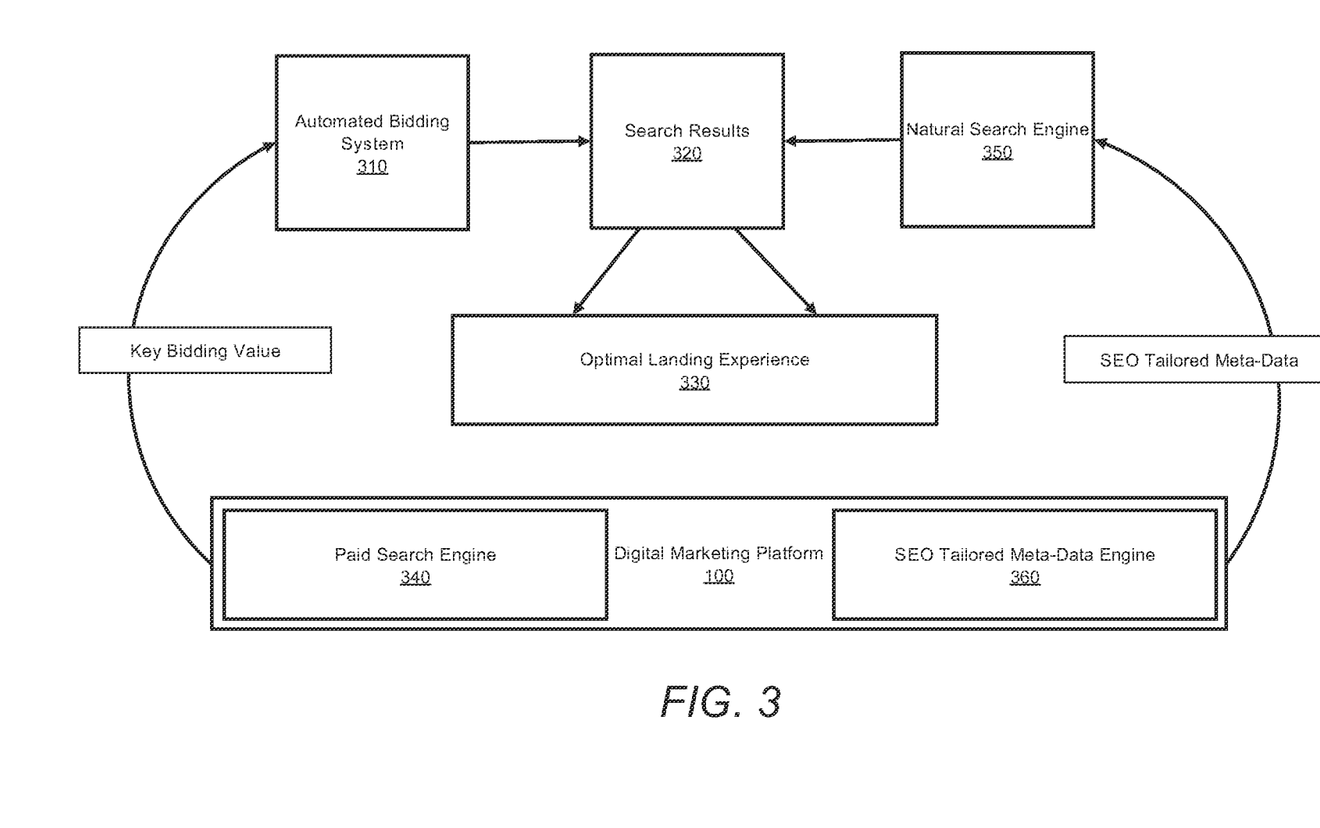
FIG. 3 illustrates a data flow diagram for paid search and search marketing optimization, according to an embodiment.

As shown in FIG. 3, the digital marketing platform 100 optimizes a landing experience by optimizing search marketing and paid search. A landing page is a web page that is displayed when a potential customer clicks on a link in the search results. Therefore, by improving placement, i.e., higher placement, in the search results, the landing experience is optimized because there is a better chance of a potential customer landing on a specific landing page. Improving the landing experience may maximize conversions, i.e., improve the percentage of visitors to the web site that may become customers by purchasing goods or services.

In order to optimize the landing experience through paid search, the digital marketing platform 100 outputs a key bidding value for a particular keyword and a particular placement or ranking for an associated ad. A key bidding value is an estimate of an optimal amount to invest for ad placement associated with search results 320 for a particular keyword. For example, if the keyword is "drum" and "Company A" would like to have its web site "Web page A" listed early in ad placement for the search results 320, a paid search engine 340 of the digital marketing platform 100 outputs an optimal bid, i.e., key bidding value, for the placement. If an automated bidding system 310 accepts the key bidding value and places "Web page A" higher for the search results 320, an optimal landing experience 330 has been created.

In order to optimize the landing experience through search marketing, the digital marketing platform 100 outputs search engine optimized (SEO) tailored meta-data. Meta-data may include keywords inserted in a meta-tag area of a web site, and the keywords are used to index web pages. SEO tailored meta-data is an optimal list of keywords produced by an SEO tailored meta-data engine 360 to be incorporated into a web page such that the web page will be indexed and placed higher in search results 320 produced by a natural search engine 350. For example, if "Company A" would like to have its web page "Web page A" indexed and listed early in search results 320 for the word "drum" when the word "drum" is searched by a potential customer, the SEO tailored meta-data engine 360 of the digital marketing platform 100 outputs an optimal list of keywords, i.e., SEO tailored meta-data, to be incorporated into "Web page A". Thus, an optimal landing experience 330 has been created. Historic data, which may be included in models, may be used by the paid search engine 340 and the SEO tailored meta data engine 360 to determine the key bidding value and the SEO tailored meta data.

3. Display Advertising

According to an embodiment, the digital marketing platform 100 performs optimization of a display advertising marketing channel. Display advertising involves the for placement of an ad within a web site or a location within a web page. Advertisers can enter a competitive bidding process for a particular placement of a display ad. Display advertising can be optimized by estimating an optimal investment in the display advertising marketing channel to maximize returns.

Figure 4:
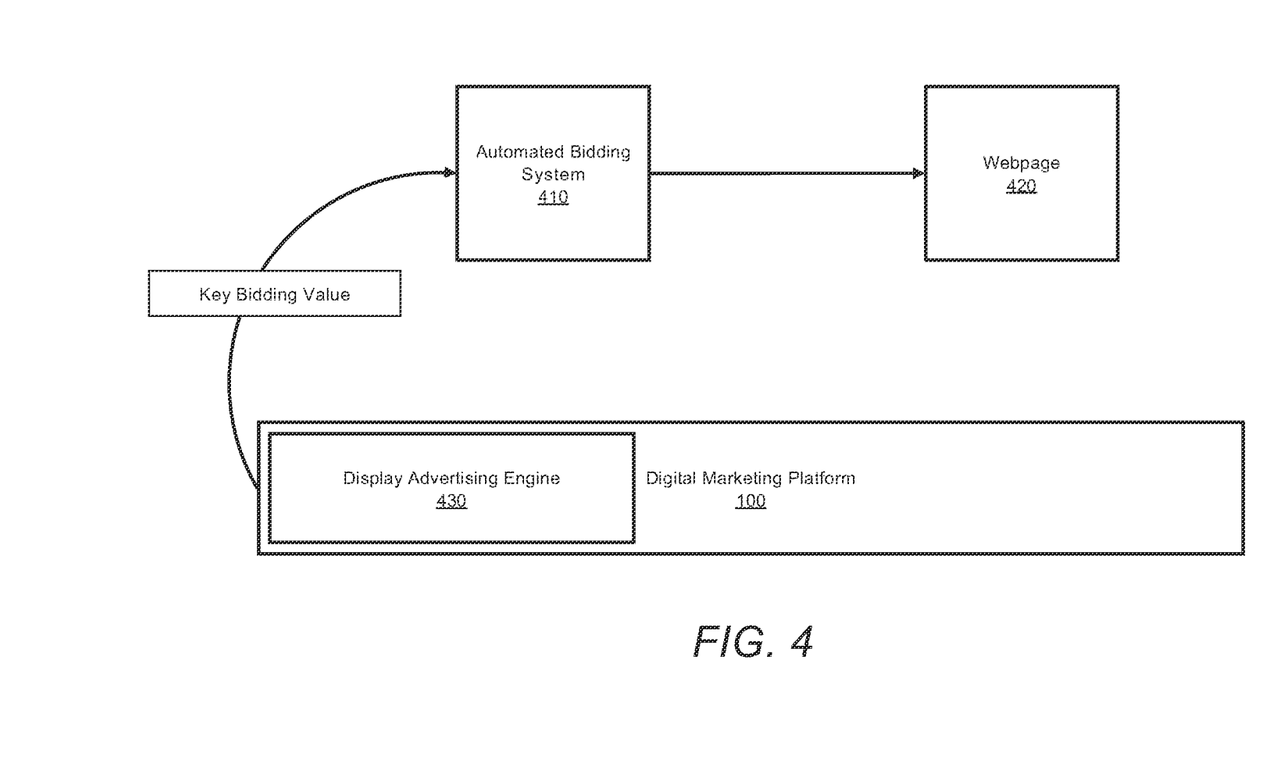
FIG. 4 illustrates a data flow diagram for display advertising optimization, according to an embodiment.

In order to optimize display marketing, the digital marketing platform 100 in FIG. 4 outputs a key bidding value for a particular ad for placement in web page 420. A key bidding value for a particular ad is an estimate of an optimal amount to invest in an ad placement in a web site or web page. For example, if "Company B" would like a banner ad to appear on the top of "Web page B", display advertising engine 430 of the digital marketing platform 100 outputs an optimal bid, i.e., key bidding value, for the placement of the banner ad on the top of "Web page B". If the automated bidding system 410 accepts the key bidding value and places the banner ad on to the top of "Web page B", display advertising has been optimized.

4. Social Networking and Viral Marketing

According to an embodiment, the digital marketing platform 100 analyzes the impact of social networking campaigns and viral marketing to increase brand visibility and awareness. Advertisers may advertise directly on the social networking sites to increase web presence. For example, many companies advertise products or services on FACEBOOK, a common social network. Viral marketing may include ads that self-replicate and then spread throughout the web by email, social networking sites, text messages, etc.

Figure 5:
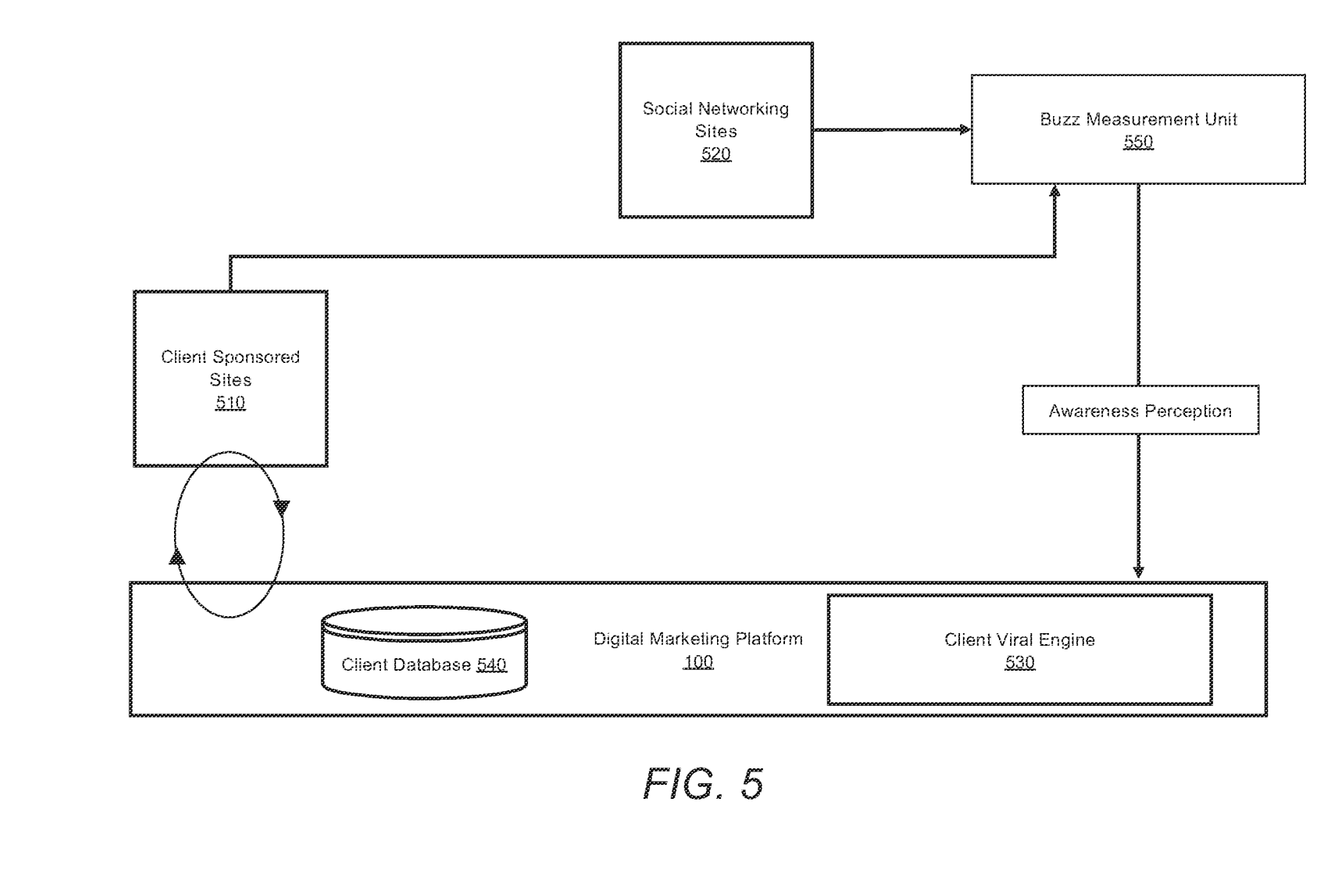
FIG. 5 illustrates a data flow diagram for impact analysis of social networking and viral marketing, according to an embodiment.

In order to generate viral marketing, the digital marketing platform 100 shown in FIG. 5 generates buzz, such as, newsworthy events, videos, tweets, emails or blog entries, that attract attention, and quickly become viral. Client viral engine 530 of the digital marketing platform 100 replicates the buzz and electronically sends the buzz to clients in a client database 540. The client viral engine 530 also collects data regarding clients including content determined to influence purchase decisions, for example, based on historic or experimental analysis. The collected data may include data about conversions and historic campaign effectiveness. The client viral engine 530 stores client data in the client database 540.

In order to measure the impact of social networking and viral marketing, the digital marketing platform 100 measures awareness and perception for specific products or services, indicating users' brand awareness. The buzz measurement unit 550 collects awareness perception data of web users from client sponsored sites 510 and social networking sites 520. The awareness perception data is input into the digital marketing platform 100 for impact analysis.

5. Content Management

According to an embodiment, the digital marketing platform 100 may use dynamic object-oriented publishing to enable end-to-end optimization of the user experience. Content which may be dynamically selected and/or modified is stored in an object-oriented manner and supports dynamic publishing of the content across various brands and marketing channels.

Figure 6:
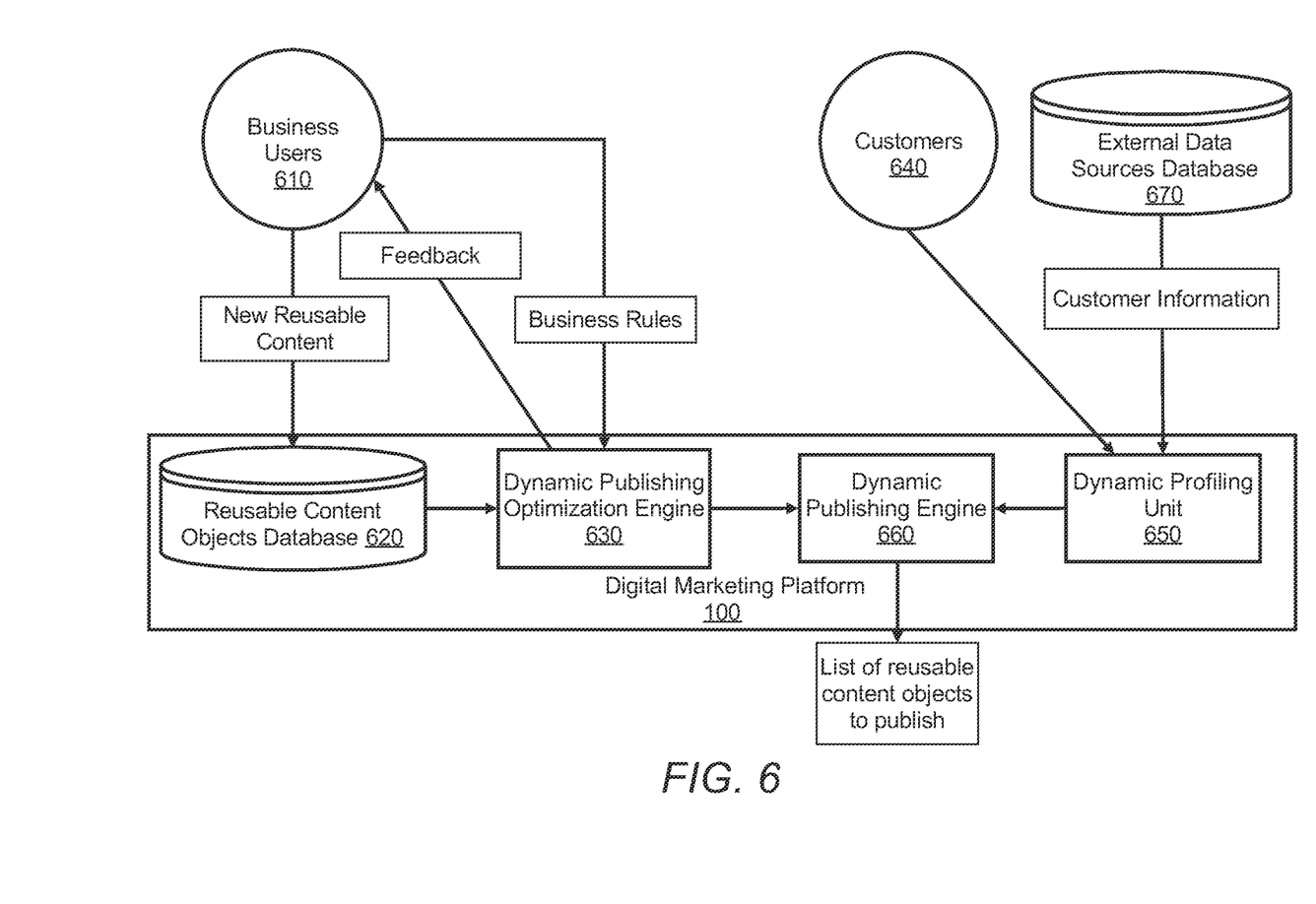
FIG. 6 illustrates a data flow diagram for dynamic publishing and content management, according to an embodiment.

FIG. 6 illustrates a data flow diagram in which users 610, which may include businesses, provide new reusable content to a reusable content objects database 620. The digital marketing platform 100 may use reusable content objects to support dynamic publishing across brands and channels. The reusable content objects database 620 may include reusable content stored in an object-oriented manner and may be dynamically published.

Business users 610 may also provide business rules to dynamic publishing optimization engine 630. The business rules may identify rules or constraints on publishing, such as no advertising on pornographic web sites, do not place ads for similar products from the same brand on the same web page, or a content type can used only for a specific segment in a specific region, etc. The rules may be used to modify and place content.

The dynamic publishing optimization engine 630 provides a list of reusable content objects from the reusable content objects database 620 to use for dynamic publishing. The list of reusable contents is provided to the business users 610 as feedback and may be used for publishing content in ads or in other marketing information. The list may be identified from historic data as being the content most likely to generate sales.

Customers 640 provide customer information or other customer information is provided through other means to dynamic profiling unit 650. The dynamic profiling unit 650 uses the customer information and external data sources from external data sources database 670 to provide up-to-date dynamic customer profiles to dynamic publishing engine 660. The dynamic publishing engine 660 determines which reusable content objects of the optimal list of reusable content objects to publish based on the customer information and external data sources. This process creates an optimal personal experience for the customer 640.

6. System for Dynamic Online User Experience

Figure 7:
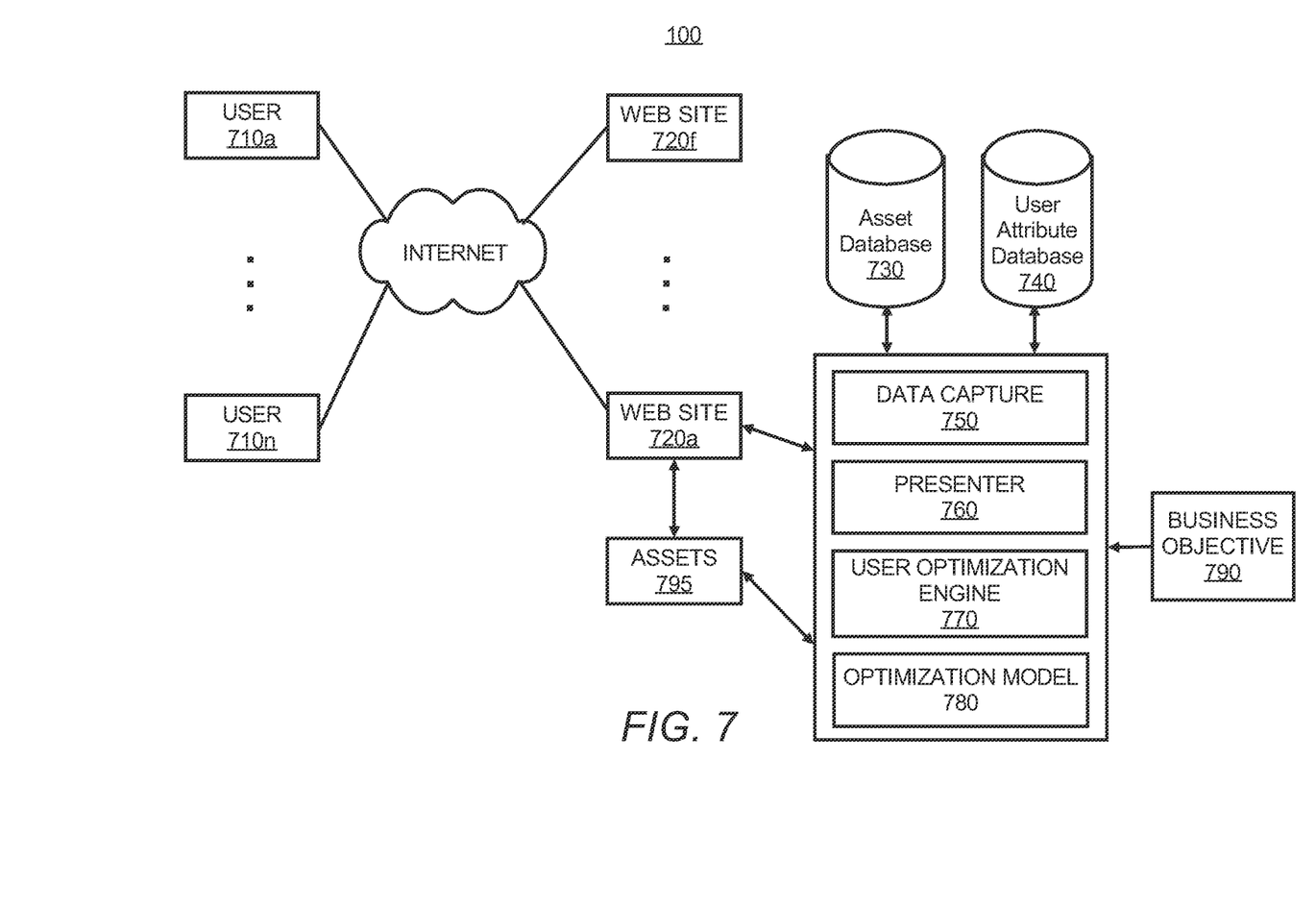
FIG. 7 illustrates a system for providing a dynamic online user experience, according to an embodiment.

FIG. 7 illustrates a system 700 for dynamic modification of the online user experience. The system 700 may be part of the digital marketing platform 100. The system 700 includes user attribute database 740, asset database 730, user optimization engine 770, optimization model 780, and presenter 760.

Users 710*a-n* may surf the Internet by accessing web sites through an end user device connected to the Internet. For example, the user 710*a* visits web site 720*a*. User data for the user 710*a* is captured by data capture unit 750. The data capture unit 750 determines any information that identifies or can be used to identify attributes of the user 710*a*. For example, the data capture unit 750 may determine an IP address of the user 710*a* from a data packet from the user 710*a*. In another example, the user 710*a* logs into web site 720*a*, and the login ID is captured when it is entered. The captured user data may be used to query the user attribute database 740 to determine more information about the user. The user attribute database 740 may store user profiles including user attributes, such as gender, geographic location, purchase habits, user preferences, etc.

The user optimization engine 770 uses the attributes of the user 710*a*, information about available assets for the web site 720*a* in the asset database 730, an optimization model 780 and a business objective 790 to determine how to configure assets for the web site 720*a* to achieve the business objective 790. The assets in the asset database 730 may include any discrete digital asset uniquely identified by meta-data such as web pages, images, paragraphs, videos, copy (i.e., written content), advertising, applications, such as e-commerce applications, or any information that can be presented to a visitor of the web site 720*a*. The assets are modified or dynamically presented to change the user experience and achieve the business objective 790.

The optimization model 780 includes historic information regarding resulting user behavior in response to various combinations of assets presented to users having particular user attributes. The user optimization engine 770 matches the attributes of the user 710*a* with a combinations of assets 795 that have been shown to produce user behavior that is estimated to achieve the business objective 790. The optimization model 780 is used to select the assets 795

Figure 8:
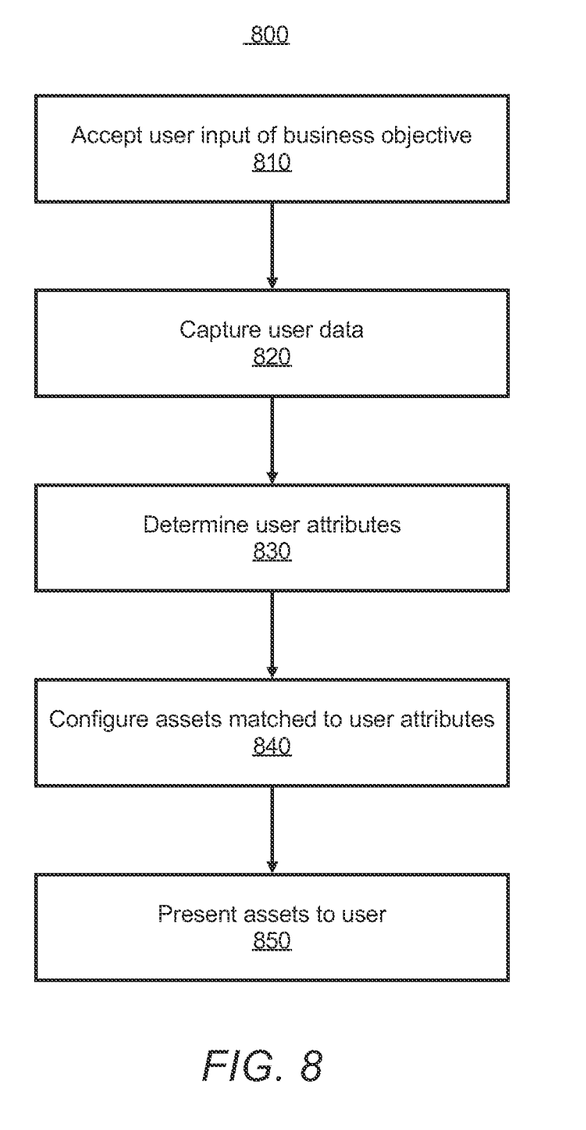
FIG. 8 illustrates a flowchart of a method for providing a dynamic online user experience, according to an embodiment.

FIG. 8 shows a flowchart of a method 800 generating a dynamic user experience, according to an embodiment. The method 800 may be implemented on the digital marketing platform 100 described above referring to FIG. 7 by way of example. The method 800 may be practiced in other systems.

In step 810, the digital marketing platform 100 accepts input of business objective 790 from a user. For example, the business objective can be to maximize sales of a certain product.

In step 820, the digital marketing platform 100 captures user data of a user visiting a web site. Captured data can include IP addresses, login information, user preferences, time of visit to the web site, etc.

In step 830, the digital marketing platform 100 analyzes the captured user data to determine if the captured user data contains any identifying information that identifies or can be used to identify attributes of the user. If user attributes are identified, the user attributes are stored in the user attribute database 740. The user attribute database 740 can store user profiles as well, including user attributes such as gender, geographic location, purchase habits, user preferences, etc. The captured user data from step 810 may also be used to query the user attribute database 740 to determine more information about the user such as user preferences.

In step 840, the user optimization engine 770 determines how to configure assets for a web site using user attributes, asset information, the optimization model 780 and the business objective 790. As described above, the user attribute information may include user attribute information determined from captured user data, user attribute information determined from user profiles by querying the user attribute database 740. Assets may include applications, such as e-commerce applications, images, copy (i.e., written content), advertising, or any information that can be presented to a visitor. In one example, the user optimization engine 770 may determine from the optimization model 780 that users with the attributes of the user are more inclined to make certain purchases, e.g., more expensive items in a catalog, if these items are displayed first with large images and extended product descriptions. In this step, the user optimization engine 770 also identifies advertising, another asset, for the particular products associate with the attributes of the user. The user optimization engine 770 then configures the assets as described, for example, placing the most expensive items first on a web page with large images and providing ads on the web page for the expensive catalog items. Templates may be used to configure the assets on-the-fly. For example, a web page template for a product catalog may have predetermined locations for inserting product descriptions and images, as well as ad locations. The optimization engine 770 retrieves the assets from the database that were selected based on the model, and may incorporate the assets in the template in the corresponding locations. Different templates may be provided for different types of web pages.

In step 850, the presenter 760 is provided with the configured combination of assets output from the optimization engine 770 and presents these to the user via a browser.

An example of the method 800 is now described. The business objective 790 accepted by the digital marketing platform 100 is to increase profits by maximizing sales. Attributes for the user 710*a* are determined to be male, age 40, and the user's location is Washington D.C. One of the assets for the web site 720*a* is an e-commerce application that generates a product catalog. Another asset is the advertising presented on the web site with the catalog. Another asset may include text and images presented in the catalog. From the optimization model 780, the user optimization engine 770 determines that a user with the attributes of the user 710*a* are more inclined to make purchases of more expensive items in the catalog if these items are displayed first with large images and extended product descriptions. Also, the user optimization engine 770 identifies advertising for particular products associated with the demographics of the user 710*a*. The user optimization engine 770 configures the assets to maximize the possibility of the user 710*a* purchasing more expensive items from the product catalog. This may include presenting the most expensive items first with large images and product descriptions. This may also include providing advertising for similar items.

The assets and their configurations determined by the user optimization engine 770 are provided to the presenter 760. The presenter 760 presents the assets to the user 710*a*, for example, via a browser. FIG. 7 shows multiple web sites 720*a-f*, and each web site may include the back end shown for the web site 720*a* that allows dynamic presentation of assets to achieve a business objective.

The modification and selection of assets to achieve the business objective is applicable to a complete user experience that may range from offline to online environments. Offline environments may include advertising in newspaper or TV channels. Offline environments may include in-store environments. Examples of modifying and/or selecting offline assets to achieve a business objective may include determining location of products in a store, or determining the type of ads or coupons that have a greater possibility of increasing sales.

7. Micro-Segmentation

The user optimization engine 770 of FIG. 7 may apply micro-segmented weighted metrics when determining modifications to assets for presentation to the user. Micro-segmentation can be used in any channel where granular data is available such as display advertising. Micro-segmentation includes identifying attributes specific to a particular user, tracking those attributes and determining modifications to assets based on those attributes. These attributes may be given greater weights when determining modifications and combinations of assets to present to the user to achieve the business objective. In one example, the user's age may be given greater weight to identify the types of products to advertise.

A method of using micro-segmentation includes determining a user; selecting one or more attributes specific to the user, applying greater weighting to the attributes specific to the user when compared to other attributes; using the weighted attributes and the other attributes to determine assets for a user experience; and presenting the determined assets to the user. The determined assets may include online advertising assets that are selected and/or modified to maximize conversion of an online ad presented to a user. Ad conversion may include selection of an ad, such as click-throughs.

8. Digital Marketing Platform and Marketing Dashboard

As discussed above, the digital marketing platform 100 offers users an opportunity to optimize various marketing channels of a multichannel marketing campaign by incorporating optimization engines into the digital marketing platform system 100 infrastructure.

Figure 9:
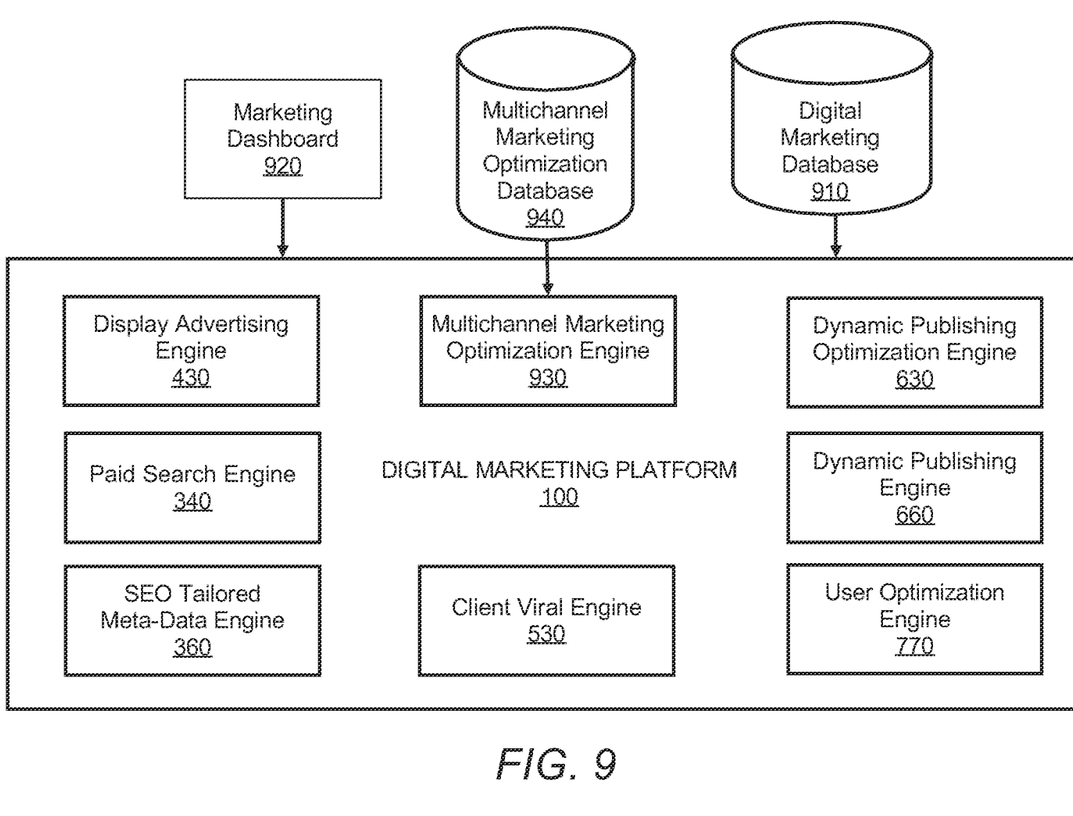
FIG. 9 illustrates a system diagram for a digital marketing platform, according to an embodiment.

FIG. 9 illustrates a system diagram of the digital marketing platform 100. The digital marketing platform 100 includes a series of optimization and publishing engines, described above, to optimize end-to-end online user experience. The digital marketing platform 100 includes the display advertising engine 430 for optimizing display advertising. The digital marketing platform 100 includes the paid search engine 340 for optimizing paid search and the SEO tailored meta-data engine 360 for optimizing search marketing. The client viral engine 530 included in digital marketing platform 100 analyzes the impact of social networking campaigns and viral marketing to increase brand awareness. The digital marketing platform 100 also includes the dynamic publishing optimization engine 630 for optimizing the selection of reusable content objects and the dynamic publishing engine 660 to provide a more customized user experience. The user optimization engine 770 is also included to provide a more customized user experience.

FIG. 9 also includes digital marketing database 910 and marketing dashboard 920 that provide a web-enabled or digital interface to the digital marketing platform 100 system. The marketing dashboard 920 allows an end user of the digital marketing platform 100 to perform many different types of marketing optimization as noted above including paid search optimization, search marketing optimization, display advertising optimization, etc.

The marketing dashboard 920 also provides an end user with useful information about current and estimated marketing investments. Specifically, the multichannel marketing optimization engine 930 provides an estimate of an optimal investment for each marketing channel of a multichannel marketing campaign, thus providing an end user with an overall marketing budget. For instance, optimization is used for budget planning purposes since a user may set the budget based upon other considerations after determining the optimal budget for each marketing channel in a multichannel marketing campaign.

Figure 10:
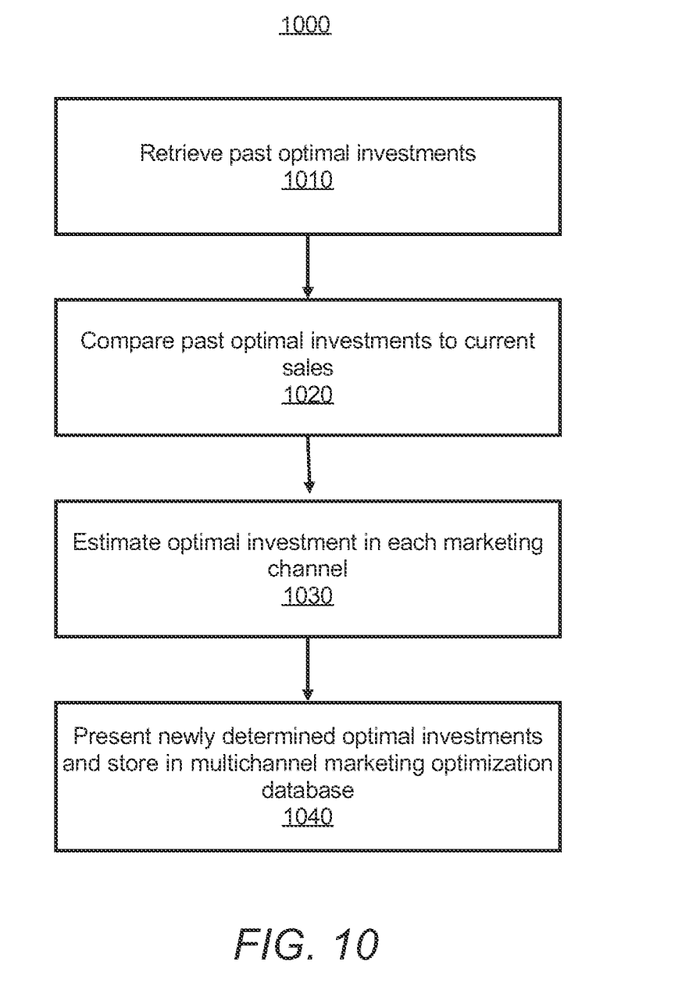
FIG. 10 illustrates a flowchart of a method for optimizing investments in a multichannel marketing campaign, according to an embodiment.

FIG. 10 illustrates a flowchart implementing method 1000 for multichannel marketing optimization, referring to FIG. 9 by way of example.

In step 1010, the multichannel marketing optimization engine 930 retrieves past optimal investments determined by the display advertising engine 430, paid search engine 340, SEO tailored meta-data engine 360, client viral engine 530, dynamic publishing optimization engine 630 and user optimization engine 770 stored in the digital marketing database 910.

In step 1020, once the past optimal investment data is received from the digital marketing database 910 in step 1010, the multichannel marketing optimization engine 930 compares past optimal investments to current sales for each marketing channel that was optimized. For example, in FIG. 11, paid search, display advertising, viral marketing and social networking investments are analyzed. Based on a sales model, a sales response is determined in which sales are mapped against investment, noting the sales made per unit of investment expenditure. The sales model by which the sales response is determined may be based upon a sales attribution formula which is established manually and includes multiple considerations including last click, proportional, panel-based, etc.

Figure 11:
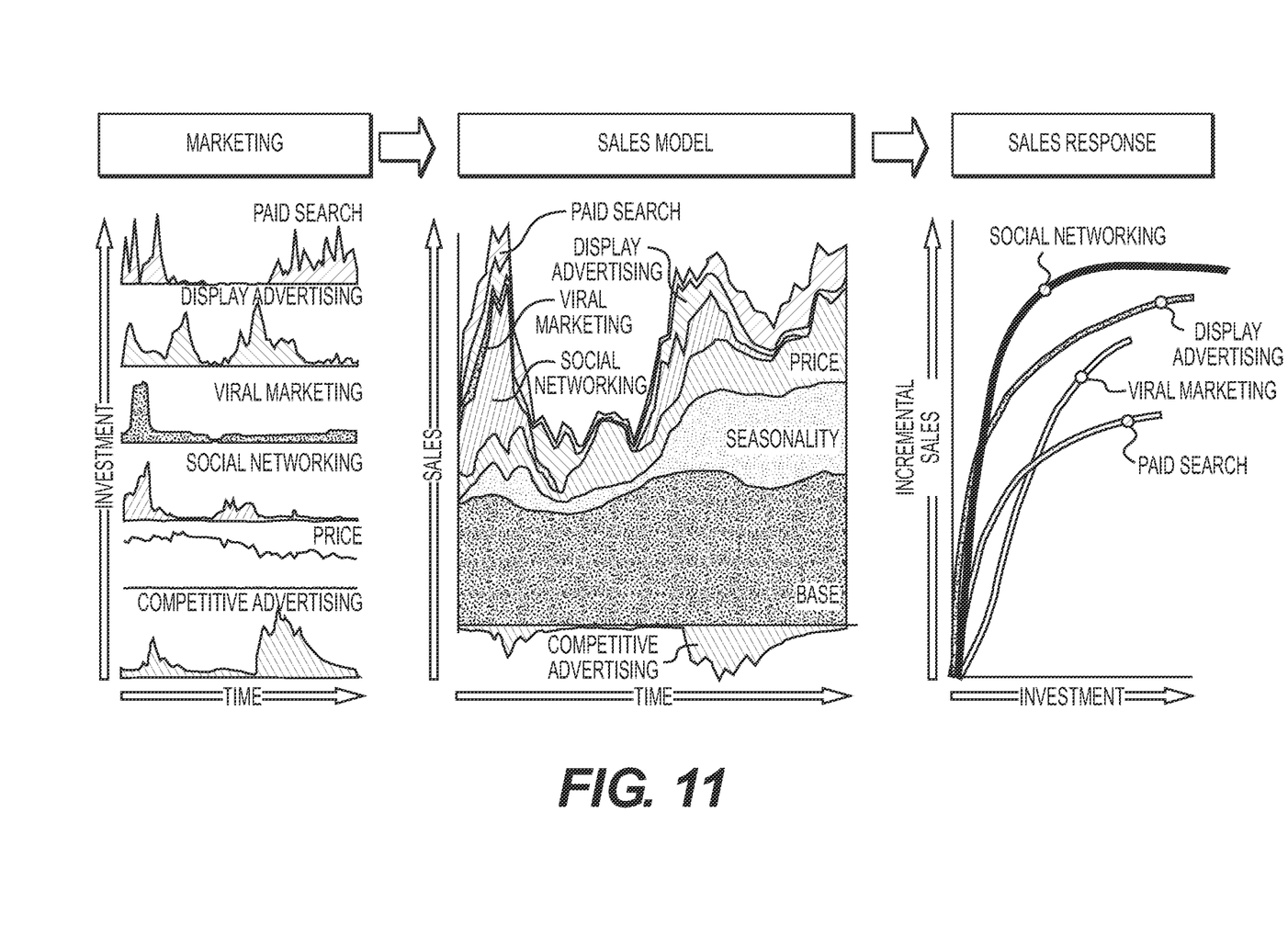
FIG. 11 illustrates sales response graphs, according to an embodiment.

In step 1030, based on the sales response data from FIG. 11 determined in step 1020, multichannel marketing optimization engine 930 estimates an optimal investment in each marketing channel of the multichannel marketing campaign, thus providing an end user with an overall marketing budget.

In step 1040, the newly determined optimal investments of step 1030 are presented to the end user through the marketing dashboard 920 and are stored in multichannel marketing optimization database 940.

One or more of the steps of the methods described herein and other steps described herein and one or more of the components of the systems described herein may be implemented as computer code stored on a computer readable medium, such as storage devices including the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments. Also, the embodiments are generally described with respect to display advertising, paid search, search marketing, viral marketing, dynamic publishing, and social networking. However, the embodiments are also applicable to optimizing other types of marketing channels.

What is claimed is:

1. A digital marketing platform to customize user experience online, the digital marketing platform comprising:
   a user attribute database storing user attribute data;
   an asset database storing assets available for a web site and asset information describing the assets;
   an optimization model including historic information regarding user behavior in response to various combinations of assets presented to users having particular attributes;
   a processor and a memory on which is executable instructions, wherein the processor:
      captures user data and determines that the captured user data contains identifying information that identifies user attribute data for the user;
      generates information associated with a product, the information including at least one of videos, text messages, social networking messages, emails and blog entries;
      replicates the information and electronically distributes the information;
      collects brand awareness of users from social networking web sites and sponsored web sites associated with the product in response to the distribution of the information, and stores the information in the user attribute database;
      retrieves user attribute data for the user from the user attribute database, wherein the user attribute data for the user includes the brand awareness for the user stored in the user attribute database, receives a business objective and rules, the rules including constraints on publishing, including constraints on advertisements for similar products on a same web page;

matches the user attribute data with a combination of the assets stored in the asset database based on the asset information and information from the optimization model indicative of user behavior that is estimated to achieve the business objective in accordance with the rules, retrieves the combination of assets from the asset database;

configures the combination of assets for presentation in a web site visited by the user based on the optimization model, the business objective, and the rules, wherein the processor determines a display size, a display order, and a description length for the product; and outputs the configured combination of assets for presentation to the user in the web site, wherein to output the configured combination of assets, the processor does not output advertisements for similar products from a same brand to be presented on a same web page.

2. The digital marketing platform of claim 1, wherein the processor determines identifying information including an IP address of the user from a data pack from the user.

3. The digital marketing platform of claim 1, wherein the captured user data is a login ID entered by the user.

4. The digital marketing platform of claim 1, wherein the user attribute database stores user profiles including user attributes including gender, geographic location, purchase habits and user preferences.

5. The digital marketing platform of claim 1, wherein the assets include applications, advertising, or any information that can be presented to a visitor of the web site.

6. The digital marketing platform of claim 1, wherein to match the user attribute data with the combination of assets is further based on inputted media channels information and offline sales data.

7. The digital marketing platform of claim 1, wherein the optimization engine outputs at least one of a dynamic user experience, a target markets and a target marketing channel and input for other marketing sites.

8. The digital marketing platform of claim 1, wherein the captured user data is used to query the user attribute data to determine more information about the user.

9. The digital marketing platform of claim 1, wherein the optimization model is used to select a combination and configuration of assets having a highest probability of achieving the business objective.

10. The digital marketing platform of claim 1, wherein the optimization engine applies micro-segmented weighted metrics when determining modifications to assets for presentation to the user.

11. The digital marketing platform of claim 10, wherein micro-segmentation includes identifying attributes specific to a particular user and determining modifications to assets based on those attributes and
  wherein the attributes are given greater weights when determining modifications and combinations of assets to present to the user to achieve the business objective.

12. A method for customizing user experience online with a digital marketing platform, the method, executed by a processor, comprising:

accepting an input of a business objective and rules, the rules including constraints on publishing based on product and brand;

capturing user data and determining whether the captured user data contains identifying information that identifies user attribute data for the user;

storing user attribute data;

storing assets available for a web site and asset information describing the assets;

generating information associated with a product, the information including at least one of videos, text messages, social networking messages, emails and blog entries;

replicating the information and electronically distributing the information;

collecting brand awareness of users from social networking web sites and sponsored web sites associated with the product in response to the distribution of the information;

storing the brand awareness;

creating an optimization model including historic information regarding user behavior in response to various combinations of assets presented to users having particular attributes;

identifying the user in response to determining the identifying information;

retrieving user attribute data for the user using the identifying information, wherein the user attribute data for the user includes the brand awareness for the user;

receiving a business objective and rules, the rules including constraints on publishing, including constraints on advertisements for similar products on a same web page;

matching the user attribute data with a combination of the assets based on information from the optimization model indicative of user behavior that is estimated to achieve a business objective in accordance with the rules;

retrieving the combination of assets from the asset database;

configuring the combination of assets for presentation in a web site visited by the user based on the optimization model, the business objective, and the rules, wherein the configuring includes determining a display size, a display order, and a description length for the product; and outputting the configured combination of assets for presentation to the user in the website, wherein outputting the configured combination of assets includes not outputting advertisements for similar products from a same brand for presentation on a same web page.

13. The method of claim 12, wherein the identifying information includes an IP address of the user from a data pack from the user.

14. The method of claim 12, wherein the captured user data is a login ID entered by the user.

15. The method of claim 12, further comprising storing user profiles including user attributes including gender, geographic location, purchase habits and user preferences.

16. The method of claim 12, wherein the assets include applications and advertising presentable to a visitor of the web site.

17. The method of claim 12, wherein the matching of the user attribute data with the combination of assets is further based on inputted media channels information and offline sales data.

18. The method of claim 12, wherein the processor outputs at least one of a dynamic user experience, a target marketing channel and input for other marketing sites.

19. The method of claim 12, wherein the captured user data is used to query the user attribute data to determine more information about the user.

20. The method of claim 12, wherein the matching includes selecting a combination and configuration of assets having a highest probability of achieving the business objective.

21. The method of claim 12, wherein the processor applies micro-segmented weighted metrics when determining modifications to assets for presentation to the user.

22. The method of claim 21, wherein micro-segmentation includes identifying attributes specific to a particular user and determining modifications to assets based on those attributes and wherein these attributes are given greater weights when determining modifications and combinations of assets to present to the user to achieve the business objective.

\* \* \* \* \*